(12) United States Patent
Northup (10) Patent No.: US 8,664,903 B2
(45) Date of Patent: Mar. 4, 2014

(54) ADAPTIVE FLUX CONTROL DRIVE

(75) Inventor: Jonathan D. Northup, Fort Wayne, IN (US)

(73) Assignee: Franklin Electric Company, Inc., Fort Wayne, IN (US)

( * ) Notice: Subject to any disclaimer, the term of this patent is extended or adjusted under 35 U.S.C. 154(b) by 303 days.

(21) Appl. No.: 13/169,659

(22) Filed: Jun. 27, 2011

(65) Prior Publication Data

US 2012/0326640 A1 Dec. 27, 2012

(51) Int. Cl.
*H02P 27/00* (2006.01)

(52) U.S. Cl.
USPC ............ 318/400.3; 318/400.02; 318/432

(58) Field of Classification Search
USPC .......... 318/400.3, 400.02, 432, 433, 437, 318/400.01, 799, 801
See application file for complete search history.

(56) References Cited

U.S. PATENT DOCUMENTS

| | | |
|---|---|---|
| 3,529,223 A | 9/1970 | Vergez, Jr. |
| 3,671,830 A | 6/1972 | Kruper |
| 3,916,274 A | 10/1975 | Lewus |
| 3,958,171 A | 5/1976 | Sekino |
| 4,137,489 A | 1/1979 | Lipo |
| 4,249,120 A | 2/1981 | Earle |
| 4,286,303 A | 8/1981 | Genheimer et al. |
| 4,307,327 A | 12/1981 | Streater et al. |
| 4,325,012 A | 4/1982 | Schaefer |
| 4,401,933 A | 8/1983 | Davy et al. |
| 4,467,258 A | 8/1984 | Leuthen |
| 4,546,300 A | 10/1985 | Shaikh |
| 4,549,122 A | 10/1985 | Berkopec et al. |
| 4,628,236 A | 12/1986 | Schaefer |
| 4,703,387 A | 10/1987 | Miller |
| 4,706,180 A | 11/1987 | Wills |
| 4,743,789 A | 5/1988 | Puskas |
| 4,757,432 A | 7/1988 | Hancock |
| 4,806,838 A | 2/1989 | Weber |
| 4,845,413 A | 7/1989 | Hackl et al. |
| 4,981,420 A | 1/1991 | Jensen et al. |
| 5,239,250 A | 8/1993 | Kalman et al. |
| 5,285,144 A | 2/1994 | Hsu et al. |
| 5,423,192 A | 6/1995 | Young et al. |
| 5,451,853 A | 9/1995 | Itoh |
| 5,455,473 A | 10/1995 | Lipo et al. |
| 5,580,221 A | 12/1996 | Triezenberg |
| 5,589,753 A | 12/1996 | Kadah et al. |
| 5,613,844 A | 3/1997 | Tuckey et al. |

(Continued)

FOREIGN PATENT DOCUMENTS

| | | |
|---|---|---|
| CN | 1937399 | 3/2007 |
| EP | 0 034 075 | 8/1981 |

(Continued)

OTHER PUBLICATIONS

POWEREX: "PS21962-4, PS21962-4A, PS21962-4C—Intellimod Module—Dual-In-Line Intelligent Power Module 5 Amperes/600 Volts", Powerex, Inc., Mar. 2007.

(Continued)

*Primary Examiner* — Karen Masih
(74) *Attorney, Agent, or Firm* — Faegre Baker Daniels LLP (57) ABSTRACT

This disclosure relates to a variable speed drive for driving a motor having a starting circuit. The variable speed drive adaptively generates motor voltages to reduce the likelihood of starting circuit intrusions.

21 Claims, 11 Drawing Sheets

(56) References Cited

U.S. PATENT DOCUMENTS

| | | | |
|---|---|---|---|
| 5,625,545 | A | 4/1997 | Hammond |
| 5,633,790 | A | 5/1997 | Gritter et al. |
| 5,650,707 | A | 7/1997 | Lipo et al. |
| 5,672,950 | A | 9/1997 | Kemp et al. |
| 5,675,231 | A | 10/1997 | Becerra et al. |
| 5,811,955 | A | 9/1998 | Kachuk |
| 5,825,113 | A | 10/1998 | Lipo et al. |
| 5,828,200 | A | 10/1998 | Ligman et al. |
| 5,839,365 | A | 11/1998 | Calbrix et al. |
| 5,859,519 | A | 1/1999 | Archer |
| 5,883,488 | A | 3/1999 | Woodward |
| 5,883,490 | A | 3/1999 | Moreira |
| 6,022,196 | A | 2/2000 | Jensen et al. |
| 6,121,749 | A | 9/2000 | Wills et al. |
| 6,141,217 | A | 10/2000 | Nakahama et al. |
| 6,167,965 | B1 | 1/2001 | Bearden et al. |
| 6,249,104 | B1 | 6/2001 | Janicek |
| 6,264,431 | B1 | 7/2001 | Triezenberg |
| 6,320,348 | B1 | 11/2001 | Kadah |
| 6,329,783 | B1 | 12/2001 | Vrionis et al. |
| 6,469,469 | B1 | 10/2002 | Chambers et al. |
| 6,515,386 | B2 | 2/2003 | Jacobsen |
| 6,653,806 | B1 | 11/2003 | Ono |
| 6,977,478 | B2 | 12/2005 | Biamonte et al. |
| 7,061,204 | B2 | 6/2006 | Unno |
| 7,064,463 | B2 | 6/2006 | Matin et al. |
| 7,071,650 | B2 | 7/2006 | Ilda |
| 7,188,669 | B2 | 3/2007 | Bullock et al. |
| 7,215,051 | B2 | 5/2007 | Neri |
| 7,307,400 | B2 | 12/2007 | Rastogi et al. |
| 7,391,179 | B2 | 6/2008 | Zhao |
| 7,471,058 | B2 | 12/2008 | Duarte et al. |
| 7,508,147 | B2 | 3/2009 | Rastogi et al. |
| 7,821,217 | B2 * | 10/2010 | Abolhassani et al. ........ 318/432 |
| 2004/0088797 | A1 | 5/2004 | Darby |
| 2006/0078444 | A1 | 4/2006 | Sacher |
| 2006/0266064 | A1 | 11/2006 | Rowatt |
| 2008/0094021 | A1 | 4/2008 | Garza |
| 2008/0191659 | A1 | 8/2008 | Borsting et al. |
| 2009/0174359 | A1 | 7/2009 | Gonthier et al. |
| 2009/0295316 | A1 * | 12/2009 | Patel et al. ............... 318/400.02 |
| 2011/0129368 | A1 | 6/2011 | Smith |

FOREIGN PATENT DOCUMENTS

| | | |
|---|---|---|
| JP | 5-049298 | 2/1993 |
| JP | 9-137794 | 5/1997 |
| JP | 2005-330970 | 12/2005 |
| WO | 2011-113023 | 9/2011 |

OTHER PUBLICATIONS

POWEREX: "Gen. 4 Large DIP-IPM Used as Low Cost H-Bridge", Apr. 24, 2009.

Vaez-Zadeh, S., et al., "High Average—Low Pulsating Torque Operation of Single Phase Induction Motors", IEEE, 2000, pp. 1513-1518.

Kastha, Debaprasad et al., "On-Line Search Based Pulsating Torque Compensation of a Fault Mode Single-Phase Variable Frequency Induction Motor Drive", IEEE, 1995, pp. 802-811.

* cited by examiner

ADAPTIVE FLUX CONTROL DRIVE

FIELD OF THE DISCLOSURE

The disclosure relates generally to a system and a method for driving a motor. More particularly, the disclosure relates to a system and method for adaptively controlling an operating characteristic of the motor.

BACKGROUND OF THE DISCLOSURE

Fluid supply systems use motors to drive pumps and transfer fluids from supply reservoirs, such as wells, to demand reservoirs, such as tanks. A sensor measures a characteristic of the fluid, and a controller controls operation of the motor. In some systems, the controller measures a level of the fluid in a tank and controls operation of the motor to maintain the level within a range. When the level reaches the low end of the range, the controller turns the motor on and keeps it on until the level reaches the high end of the range. In other systems, the speed of the motor is controlled to maintain a fluid characteristic within predetermined parameters. A variable speed loop controls the speed of the motor within a variable speed range to gradually increase or decrease the pumping rate and thereby reduce the variability of the fluid characteristic. Induction motors are frequently used in fluid supply systems.

Induction motors are very efficient at rated torque and speed but are inefficient at light loads. Efficiency losses can be due to, among others, core losses including hysteresis and eddy-current losses which depend on flux density and voltage frequency, copper losses which depend from current levels, and friction. Imbalances among these sources of losses, particularly between copper and core losses, result in reduced efficiency at light loads.

Many single phase systems currently in operation were not designed to operate at a variable speed. In many instances, variable speed control of a single phase motor magnifies the perceived acoustic noise generated by torque pulsations. While it is desirable to provide a variable speed system capable of operating with a variety of motors in new and retrofit applications, it is also desirable to reduce or eliminate torque pulsations and to efficiently operate the motors.

SUMMARY OF THE DISCLOSURE

Exemplary embodiments of a system and a method for driving a single phase motor are provided herein. Generally, a single phase motor includes a starting circuit engagable during motor start-up to overcome mechanical inertia. While the starting circuit is engaged, the motor draws more current than when the starting circuit is disengaged. When the starting circuit is disengaged and the motor operates in steady-state at low load, the motor's current is constant. Unexpected current behavior indicates that the starting circuit has re-engaged, which event may be referred to hereinafter as a "starting circuit intrusion". Exemplary behaviors indicative of a starting circuit intrusion include a sudden rise in current without an increase in demand, current above a threshold, and a current rise faster than a corresponding increase in demand. The drive unit generates a motor voltage according to one or more operating curves to drive the motor. Different operating curves are adaptively selected or constructed to increase efficiency or reduce noise while decreasing the likelihood of starting circuit intrusions while not unduly decreasing the variable speed range.

In one embodiment according to the disclosure, a method of operating a motor including a starting circuit is provided. The method comprises operating the motor based on a first operating curve to generate a flux in the motor; and operating the motor based on a second operating curve to increase the flux relative to the first operating curve to decrease the likelihood of a starting circuit intrusion.

In another embodiment according to the disclosure, a method of operating a motor including a starting circuit is provided. The method comprises operating the motor within a variable speed range defined by a floor and a maximum speed; and raising the floor after detecting a starting circuit intrusion.

In a further embodiment according to the disclosure, a system for driving a motor including a starting circuit is provided. The system comprises a drive unit adapted to generate a motor voltage for driving the motor, the drive unit including a memory, a plurality of processing instructions stored in the memory, and a processing device; and a sensor producing an indication based on a current flowing through the motor. The drive unit is configured to execute the plurality of processing instructions with the processing device, to generate a flux in the motor based on a first operating curve, to detect a starting circuit intrusion based on the indication, and to increase the flux, relative to the first operating curve, according to a second operating curve to decrease the likelihood of another starting circuit intrusion.

The foregoing embodiments and many of the attendant advantages of this invention will become more readily appreciated as the same become better understood by reference to the following detailed description when taken in conjunction with the accompanying drawings.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner. As used herein, the terms "comprising" and "including" denote an open transition meaning that the claim in which the open transition is used is not limited to the elements following the transitional term.

DETAILED DESCRIPTION

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the disclosure is thereby intended. The invention includes any alterations and further modifications in the illustrated devices and described methods and further applications of the principles of the invention which would normally occur to one skilled in the art to which the invention relates.

Figure 1:
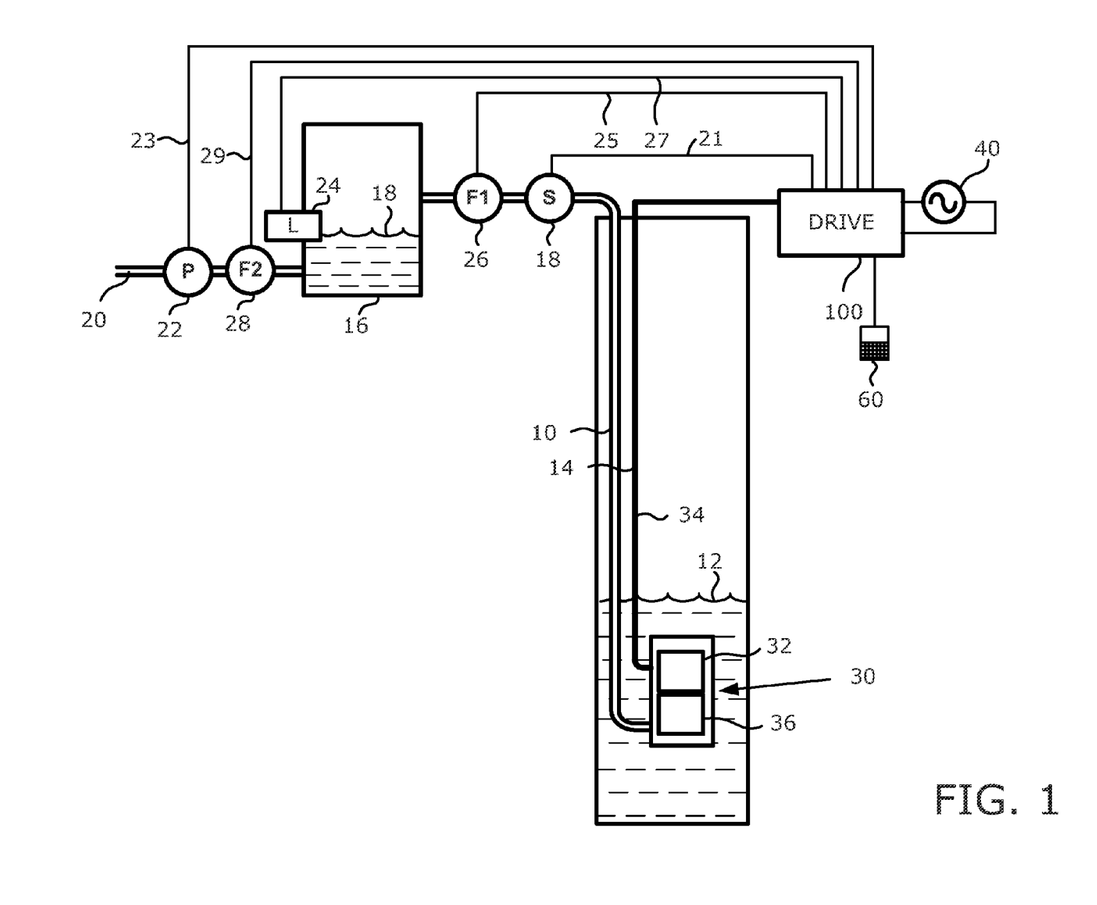
FIG. 1 is a diagrammatic representation of an exemplary liquid supply system according to one embodiment of the disclosure.

The foregoing exemplary embodiments of the disclosure will now be described with reference to the figures. Referring to FIG. 1, a diagrammatic representation of a liquid supply system is disclosed. The liquid supply system comprises a reservoir 10 containing a liquid 12 which is pumped by a pump unit 30 through a conduit 14 into a reservoir 16. Pump unit 30 includes a pump 36 driven by a motor 32 which is powered by a drive unit 100 via a connector 34. In one example, drive unit 100 is a variable frequency drive (VFD) and pump 36 is a conventional centrifugal pump. Connector 34 may comprise two or three wires to provide single phase power to motor 32.

During operation of the system, liquid 12 flows out of conduit 20. Fluid characteristics including liquid level, flow rate differential, and pressure may be monitored with a level sensor 24, flow sensors 26, 28 and a pressure sensor 22 disposed in reservoir 16, conduit 14, and conduit 20, respectively, to generate a demand signal representative of flow required to satisfy predefined conditions. Exemplary predefined conditions include fluid level, pressure and inflow/outflow rate differential. In one embodiment, a noise or vibration sensor provides signals through a line 21 to drive unit 100. An exemplary vibration sensor 18 coupled to conduit 14 is shown in FIG. 1. Sensor 18 senses vibrations of conduit 14 as fluid 12 is pumped therethrough by pump unit 30 and may be utilized to correlate noise, flow rate, torque ripple and motor parameters, and to define operating curves which minimize noise. Noise determining and reducing techniques, and ripple reduction techniques, are described in commonly owned International Pat. Appl. No. PCT/US11/28226 to Spreen et al., filed Mar. 11, 2011, which is incorporated herein by reference in its entirety. Also, an input device may be provided. An exemplary input device 60 is shown. Input device 60 is provided to receive input parameters such as setpoints and schedules. Reservoir 10 may be an aboveground or underground tank, a well casing, or any other reservoir containing liquid 12. Reservoir 16 may be an underground or aboveground tank, or any other liquid containment device.

Figure 2:
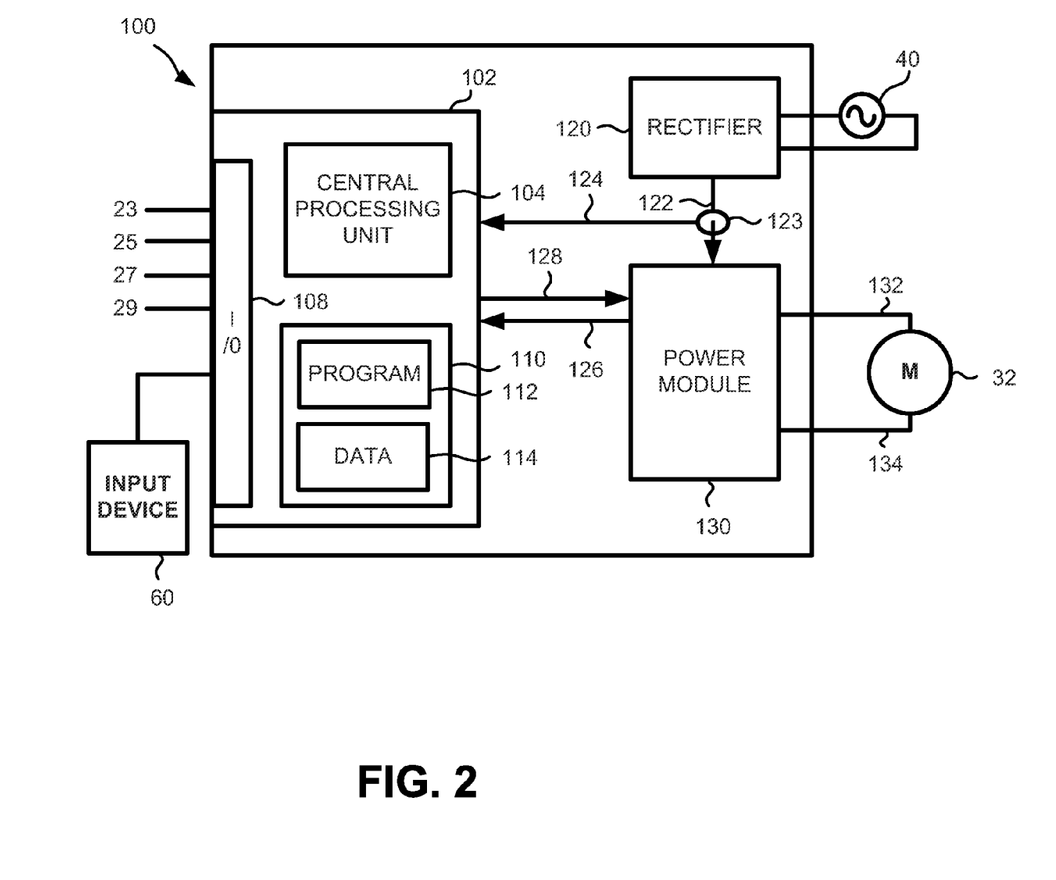
FIG. 2 is a block diagram of an exemplary drive unit according to another embodiment of the disclosure.

FIG. 2 illustrates an exemplary embodiment of drive unit 100 comprising a processing device, illustratively processing unit 102, a rectifier 120 and an inverter 130. As shown, processing unit 102 includes a CPU 104 configured to access a memory device 110 and execute processing instructions from a software application, exemplified by program 112, based on data 114. In one example, the software application comprises firmware stored in ROM while data 114 is stored in RAM. Techniques for generating motor voltages according to characteristics of a control voltage are known in the art. In one example, a technique comprises storing values in a table corresponding to samples of an operating curve. The operating curve is typically a substantially straight line defining a volts-hertz relationship. When the speed control system determines a desired operating speed, which defines an operating frequency, the drive unit looks up a voltage corresponding to the frequency. The drive unit then generates a motor voltage based on the voltage and the frequency. In another example, a formula or a function embodying the operating curve characteristics is used by CPU 104 to generate the desired motor voltages. In some embodiments of the disclosure, a plurality of tables define a plurality of operating curves and the drive unit selects, in turn, a table from the plurality of tables to generate motor voltages to drive the motor with more or less flux or larger or smaller variable speed ranges, for example, to adaptively reduce the probability of starting circuit intrusions. In one embodiment, the adaptation is dynamic since the factors which cause starting circuit intrusions, such as temperature, current, and time, vary system to system and also vary according to fluid supply requirements. In other embodiments of the disclosure, the plurality of operating curves is obtained based on a formula. Parameters of the formula are varied to define an operating curve. Exemplary parameters include the frequency at which an intrusion occurred and whether an intrusion occurred during an operating cycle.

Unless otherwise expressly stated in connection with a specific use thereof, the term "device" includes a single device, a plurality of devices, two components integrated into a device, and any variations thereof. The singular form is only used to illustrate a particular functionality and not to limit the disclosure to a single component. Therefore, the term "memory device" includes any variation of electronic circuits in which processing instructions executable by a processing device may be embedded unless otherwise expressly stated in connection with the specific use of the term. For example, a memory device includes read only memory, random access memory, a field programmable gate array, a hard-drive, a disk, flash memory, and any combinations thereof, whether physically or electronically coupled. Similarly, a processing device includes, for example, a central processing unit, a math processing unit, a plurality of processors on a common integrated circuit, and a plurality of processors operating in concert, whether physically or electronically coupled. Furthermore and in a similar manner, the term "application" includes a single application, a plurality of applications, one or more programs or subroutines, software, firmware, and any variations thereof suitable to execute instruction sequences with a processing device.

In one variation, data 114 includes one or more volts/hertz tables operable by CPU 104 to generate motor voltages according to one or more operating curves. In some embodiments, the tables embody the operating curves described further below. In another variation, data 114 comprises an operating curve formula from which CPU 104 determines control voltages to generate motor voltages. Rectifier 120 is powered by a power source 40. Inverter 130 receives DC power from rectifier 120 through a conductor 122. CPU 104 receives inputs through an I/O interface 108 and outputs a control voltage over line 128 to inverter 130. In one example, the control voltage is provided to a pulse-width-modulated (PWM) module having power switches and a controller which generates the appropriate gating signals for the power switches to convert a direct current (DC) control voltage into an alternating current (AC) motor voltage suitable to drive the motor according to the control voltage. Current drawn by inverter 130 from rectifier 120 is sensed by a current sensor 123 and a current signal is provided by current sensor 123 to CPU 104 by conductor 124. Motor voltage feedback can also be provided, for example through conductor 126 connecting inverter 130 and processing unit 102. Motor voltages may also be generated with other known or later developed drive topologies programmed in accordance with embodiments of the disclosure.

Figure 3:
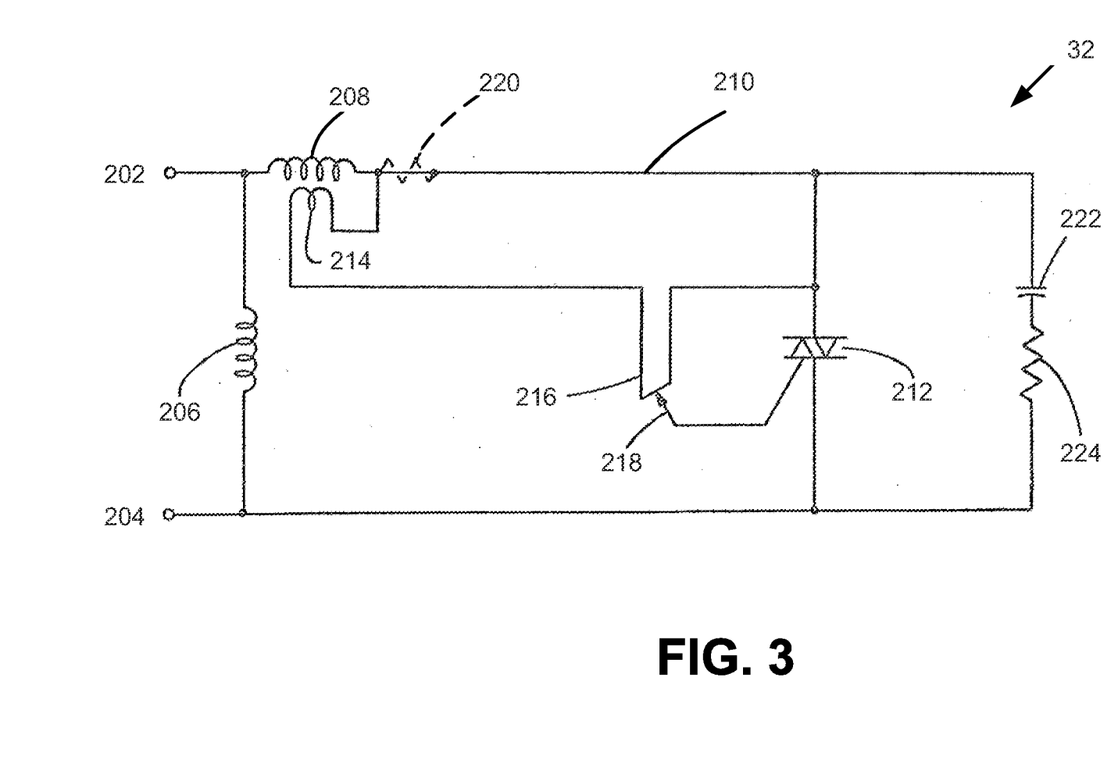
FIG. 3 is a diagrammatic representation of a single phase motor including a starting circuit.

Referring now to FIG. 3, a diagram of a single phase motor including a starting circuit is provided. The starting circuit, and variations thereof, are described in U.S. Pat. No. 4,325,012 to Schaefer, which is incorporated herein by reference in its entirety. The motor comprises conductors 202 and 204 for transferring power from drive unit 100 to primary and secondary windings 206 and 208. The starting circuit, exemplified as a cut-out circuit, comprises a power switch 212, a bimetal member 216 and a contact 218. In one variation, a snubber resistor 224 and a capacitor 222 is connected across power switch 212, and a resistor 220 may be placed in series with secondary, or start, winding 208. The power or main terminals of power switch 212 are connected in series with start winding 208, and the gate of power switch 212 is connected to contact 218. An exemplary power switch is the TMG16C60 bidirectional triode thyristor (TRIAC) manufactured by SanRex Corporation located at 50 Seaview Blvd., Port Washington, N.Y. The TMG16C60 TRIAC and equivalent TRIACs have a 5 v/μsec dv/dt critical rate of rise of commutation voltage. Generally, any electronic circuit having a gate for controlling on and off states of the circuit is suitable for use in the cut-out circuit so long as the circuit is rated to conduct the current passing through secondary winding 208. Another exemplary gated circuit comprises two unilateral thyristors, or silicon-controlled rectifiers (SCRs), in inverse parallel connection. The legs of bimetal member 216 are connected across a sensor 214. Line 210 connects start winding 208 to power switch 212 and bimetal member 216. Flux generated in the motor induces a current in sensor 214 which causes bimetal member 216 to heat up until bimetal member 216 reaches a predetermined cut-out temperature at which time it opens contact 218 to shut down current flow through power switch 212 and start winding 208. As a result, current flow through connectors 202 and 204 is reduced. In one example, sensor 214 is a coil wound concentrically with start winding 208. In another example, sensor 214 is a tertiary winding.

Without being bound by theory, it is believed that certain combinations of voltage, frequency, temperature and flux cause the starting circuit intrusions. Intrusions are more prevalent as flux is reduced to increase the motor's efficiency and reduce torque ripple. Since flux depends on the motor's construction, speed, slip and load, which vary with time, embodiments of the adaptive method according to the disclosure are applicable to increase the motor's efficiency while minimizing the likelihood, or avoiding altogether, starting circuit intrusions.

Figure 4:
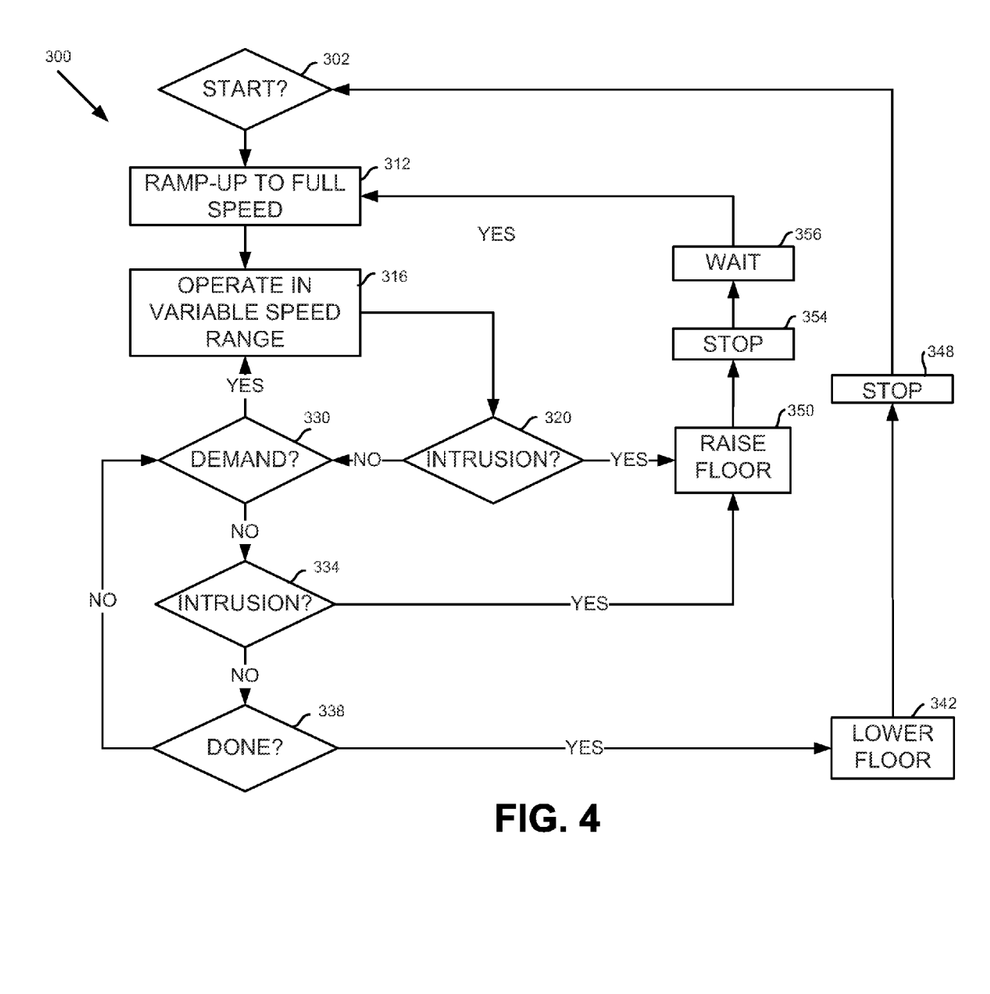
FIG. 4 is a flowchart depicting an embodiment according to the disclosure of a method for adaptively controlling a variable speed range.
Figure 5:
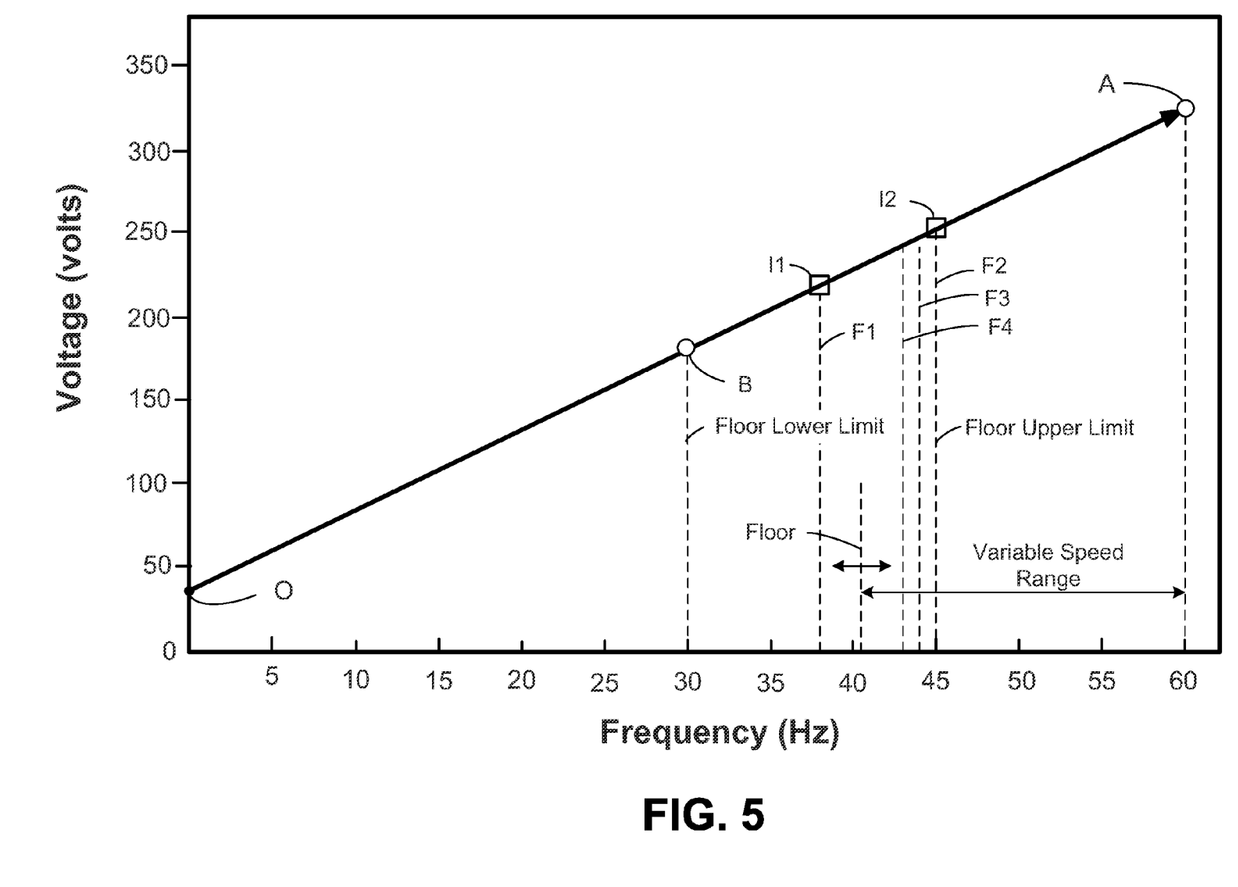
FIGS. 5 and 6 are graphs depicting a volts-hertz graph and a timing diagram illustrative of the performance of the embodiment described with reference to FIG. 4.
Figure 6:
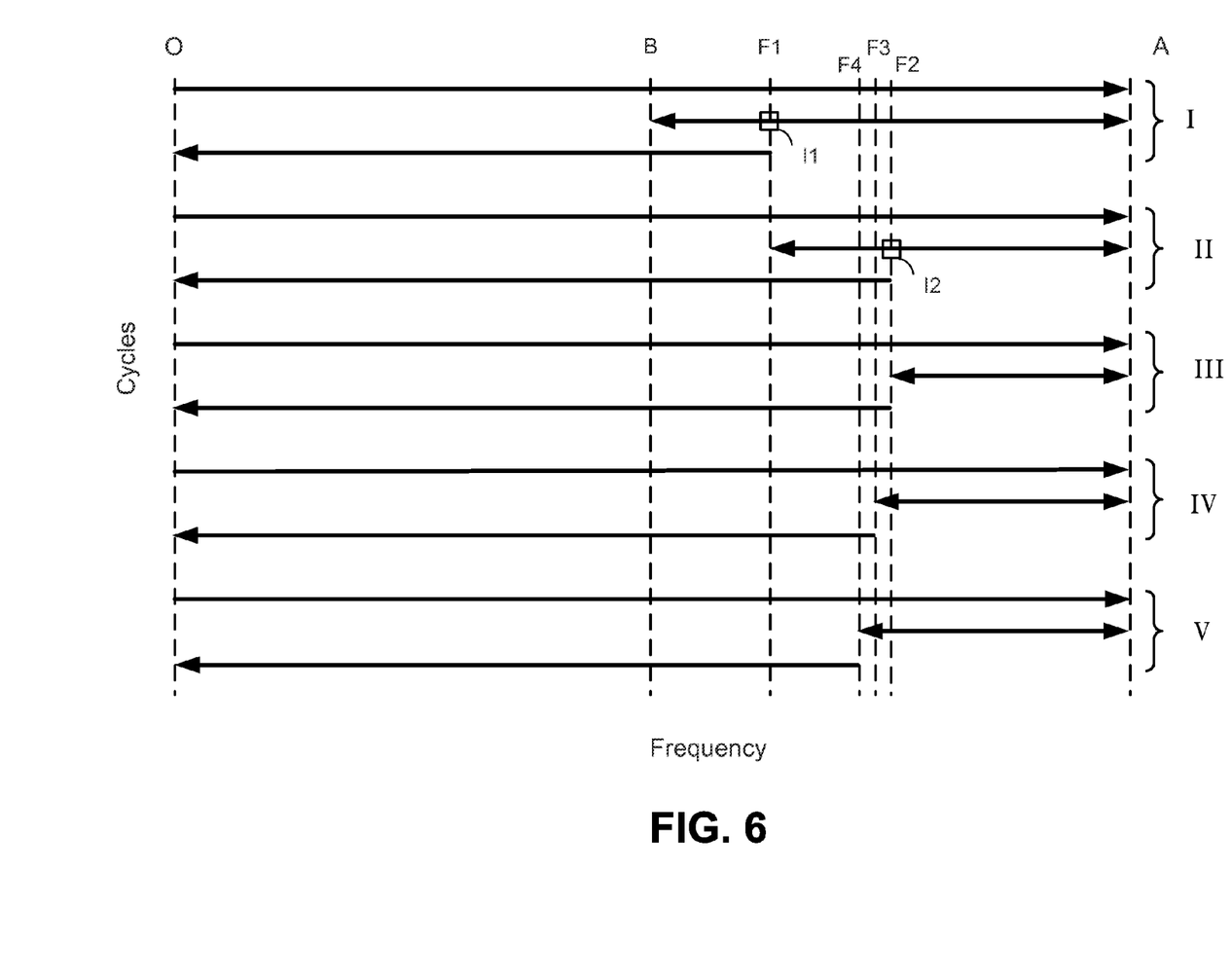

Referring now to FIGS. 4-6, a flowchart 300 is provided in FIG. 4 of an embodiment of a method according to the disclosure for adaptively controlling a single phase motor. FIGS. 5 and 6 depict a volts-hertz graph and a timing diagram illustrative of the performance of the present embodiment. The embodiment of the method is implemented with a drive unit such as the drive unit described with reference to FIG. 2. The method begins at 302 when the drive unit receives a signal which prompts the drive unit to start the motor. In one example, the signal is a fluid pressure signal which the drive unit analyzes to determine if pumping is required to increase the fluid pressure. In another example, a speed control loop provides a speed reference to the drive unit which the drive unit interprets to determine that the motor should be started. Upon receiving the signal, at 312 the drive unit ramps-up the motor to full speed. In a variation thereof, the drive unit ramps-up the motor to a speed substantially higher than an idle speed. In one example, the motor reaches full speed, and the starting circuit drops-out normally, in less than about 500 milliseconds. The start-up current peak is more than 100% of the current drawn by the motor running at a maximum speed corresponding to about 60 hertz. A motor typically draws current in excess of the maximum speed current during start-up, if the load is bound up, such as when the pump's rotor is locked, or if a starting circuit intrusion occurs. Locked rotors are typically detected during start-up, for example by detecting that the starting current does not significantly decrease as expected after the start-up period.

After reaching full speed, at 316 the motor is operated within a variable speed range. A typical variable speed range for a 60 hertz induction motor is between 30 and 60 hertz. An initial variable speed range is denoted in FIG. 5 as a line segment between points A and B (segment AB) corresponding to 30-60 hertz operation. Segment AB is denoted in FIG. 6 as the space between vertical lines corresponding to points A and B. Roman numeral I in FIG. 6 denotes a first cycle according to the present embodiment. The topmost line in each of cycles I-V represents a start-up, with the frequency increasing from 0 to 60 hertz (e.g. points O and A). The middle line in each cycle, having two arrow points, represents a variable speed range. While at 316, the speed may increase or decrease within the variable speed range.

While in the variable speed range operation mode, current is measured. At 320, a determination is made, as described above, whether an intrusion occurred. If an intrusion did not occur, at 330 a determination is made whether demand exists. If yes, variable speed control operation continues at 316. Otherwise, at 338 a determination is made whether the cycle is done. In the present embodiment, the cycle is done when the motor has idled at the minimum speed of the variable speed range due to the absence of demand for 10 seconds. A delay when no demand exists before the motor is stopped is a design choice which avoids frequent stoppages and thus stabilizes operation of the motor. In another example, the cycle is done when the drive unit receives an indication that the cycle is done. In a further example, absence of a demand or speed signal is an indication that the cycle is done. Returning to the present embodiment, if not done, presence of demand and absence of intrusions are checked again. If neither occur, after 10 seconds the cycle is done and is deemed a "normal" cycle for the purpose of illustration to indicate that no intrusions occurred.

If during a previous abnormal cycle the minimum speed, or floor, of the variable speed range had been raised, the floor is lowered at 342. Raising the floor reduces the variable speed range which is undesirable but may be necessary to prevent intrusions. However, as operation of the system may vary with changes in demand and temperature, and time, the conditions giving rise to an intrusion may change. Thus, it is advantageous after the variable speed range is reduced to attempt to increase it. According to the present embodiment, the variable speed range is increased after completion of a normal cycle. The variable speed range is not increased beyond a floor upper limit or decreased below a floor lower limit. In one example, the floor lower limit corresponds to a minimum nameplate speed of the motor. In another example, the floor lower limit is preset to ensure a minimum fluid supply when the motor idles. In a further example, the floor lower limit is set such that it produces a pumping rate insufficient to maintain a desired line pressure. Thus, if fluid is discharged by the system, the target pressure will drop and a demand signal will be promptly generated. In a yet further example, a floor upper limit is set to ensure a minimum variable speed range.

At 348 the motor is stopped by reducing its speed to zero as illustrated with reference to FIG. 6 by the bottom-most lines, having left arrow points, in each cycle. In one example, the floor is raised or lowered anytime after a cycle has been completed. At 350, the floor is raised because an intrusion was detected at 320 (during variable speed operation) or at 334 (while idling). Then, the motor is stopped at 354. At 356 a wait period is instituted before the motor can be restarted. The wait period enables the starting circuit currents to dissipate. After the wait period or when demand exists, the next cycle is started at 302.

Referring again to FIGS. 5 and 6, hypothetical cycles I and II represent abnormal cycles, evidenced by the presence of intrusion I1 in cycle I and intrusion I2 in cycle II, and cycles III-V represent hypothetical normal cycles. In cycle I, intrusion I1 illustrates detection of an intrusion with the motor operating at about 37 hertz. Thus, according to the embodiment described with reference to FIG. 5, the motor is stopped and then restarted with a new variable speed range defined by a higher floor F1 and 60 hertz. In cycle II, intrusion I2 illustrates detection of an intrusion with the motor operating at about 45 hertz. Thus, the motor is stopped and then restarted with a smaller variable speed range defined by a higher floor F2 and 60 hertz. In cycle III, no intrusion was detected so the motor is stopped normally and then restarted in cycle IV with an increased variable speed range defined by a lower floor F3 and 60 hertz. Similarly, in cycle V the range is increased by moving the floor from F3 to F4. As the foregoing description illustrates, the method allows for adaptive increases and decreases of the variable speed range in response to the detection of intrusions. As illustrated in FIG. 5, the floor upper limit defines a minimum of 15 hertz variable speed range. If an intrusion is detected within that range, the floor is not raised. In another variation, the floor is lowered by a fixed amount each time a normal cycle ends while the floor is above the floor lower limit. In one example, the fixed amount is 1 hertz. In a further variation, if the intrusion is detected at a frequency which is a fraction of a hertz above the floor, the floor is raised by a minimum amount of at least 1 hertz.

Figure 7:
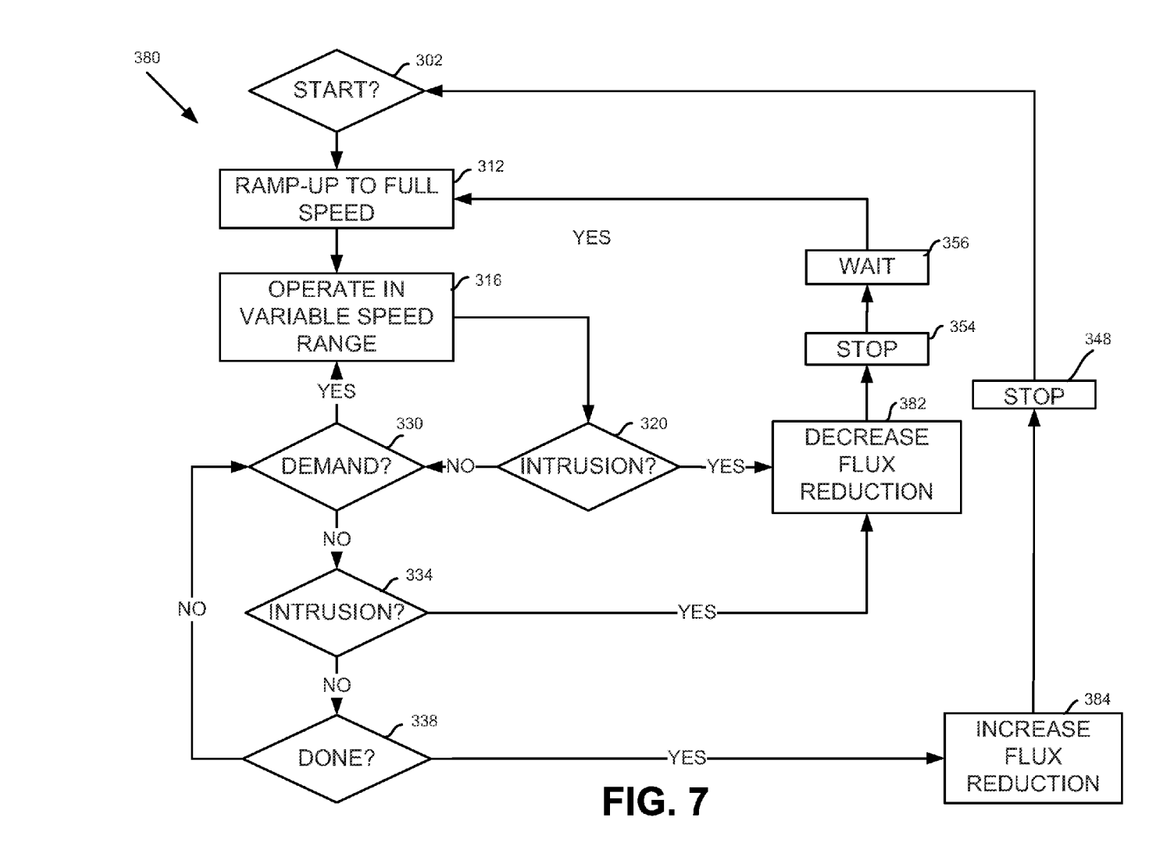
FIG. 7 is a flowchart depicting another embodiment according to the disclosure of a method for adaptively controlling flux.
Figure 8:
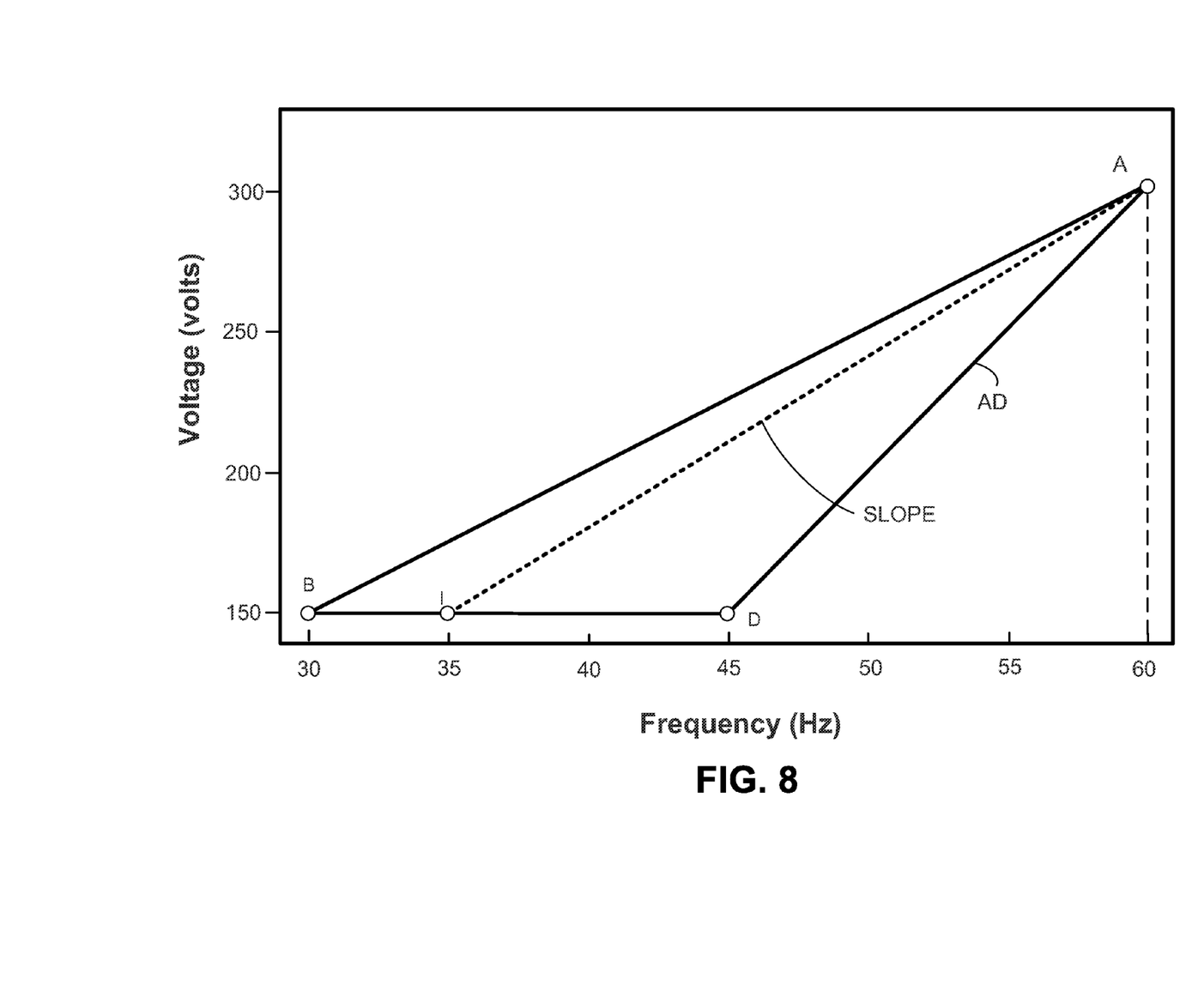
FIGS. 8-11 are volts-hertz graphs illustrative of additional embodiments of a method to reduce the likelihood of starting circuit intrusions.

Referring now to FIG. 7, a flowchart 380 is provided to illustrate another embodiment of a method according to the disclosure for adaptively controlling a single phase motor. The present embodiment is similar to the embodiment described with reference to FIG. 4 and flowchart 300 except that instead of raising and lowering the floor of the variable speed range, the amount of flux reduction is increased or decreased. After a normal cycle ends, the amount of flux reduction is increased at 384. After an abnormal cycle ends, the amount of flux reduction is decreased at 382. In one variation, the amount of flux reduction is not increased above a flux reduction upper limit or reduced below a flux reduction lower limit. Referring to FIG. 8, in one example, the flux reduction lower limit coincides with segment AB and the flux reduction upper limit coincides with segment AD. In the present variation, the operating curve comprises segment AI and flux reduction is increased or decreased by increasing or decreasing, respectively, the slope of a segment AI. In one example, segment AI and segment BI represent the variable speed range of the operating curve. In another example, point I establishes a floor, as described with reference to FIG. 5, and the variable speed range only comprises segment AI.

Figure 9:
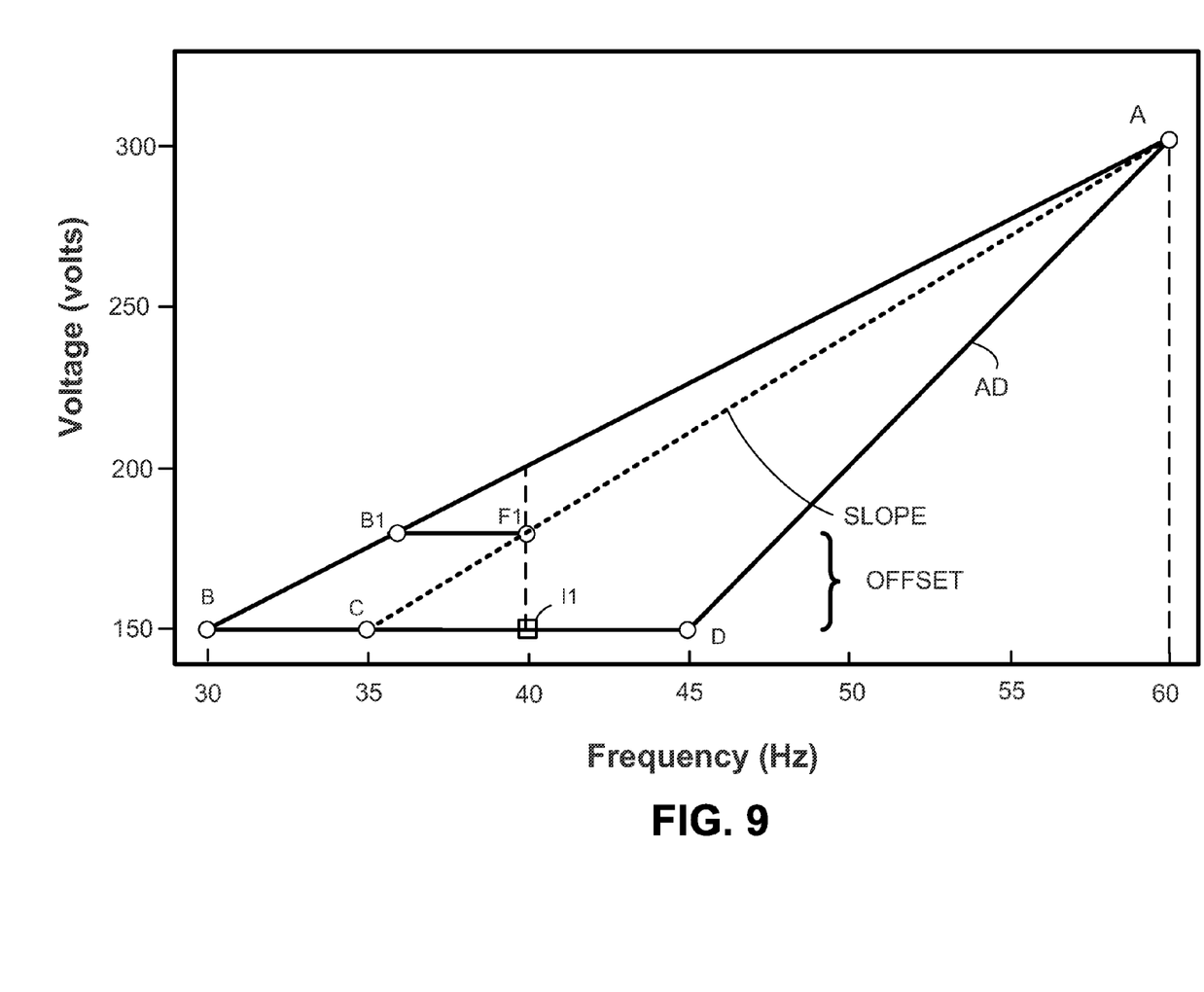
Figure 10:
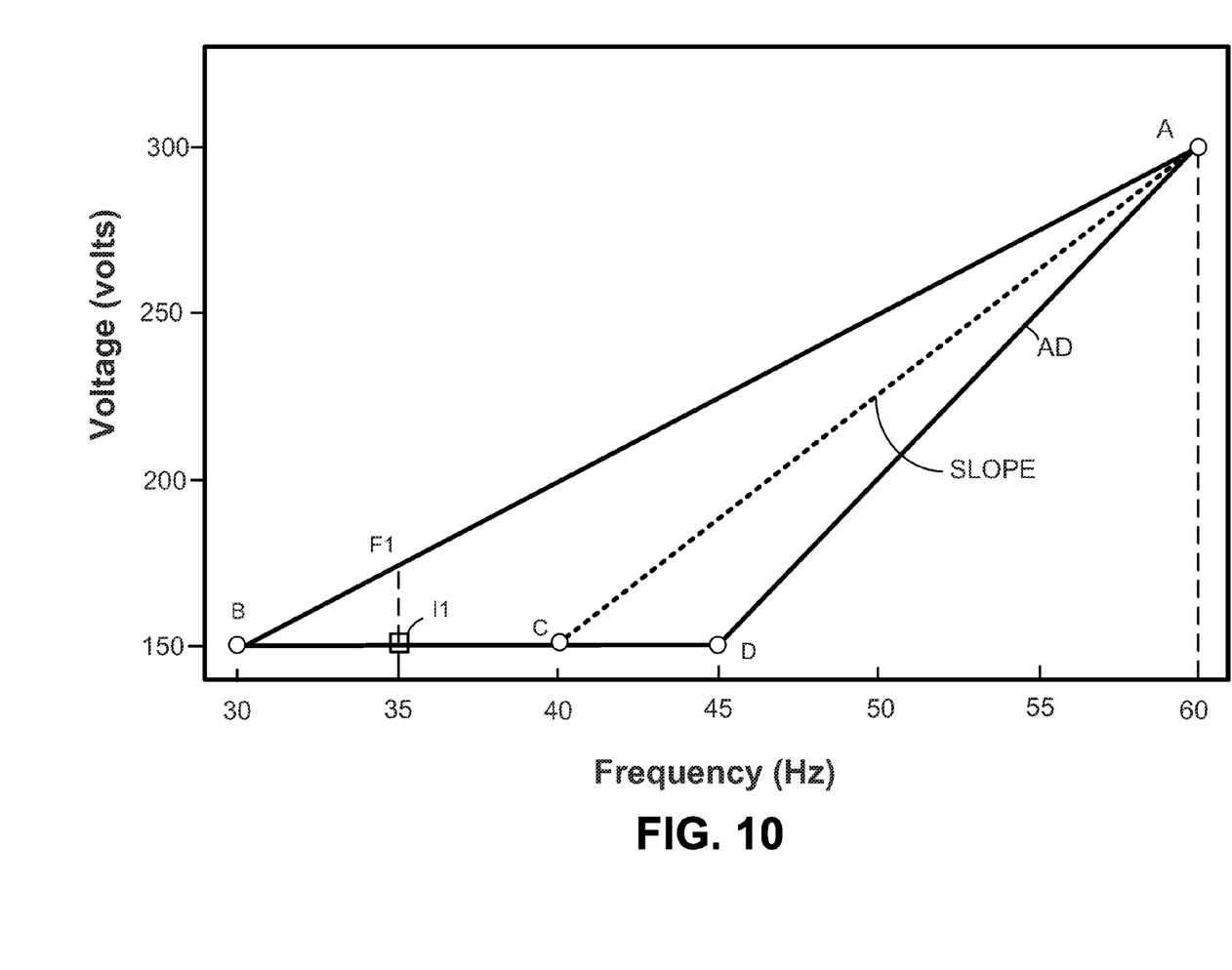
Figure 11:
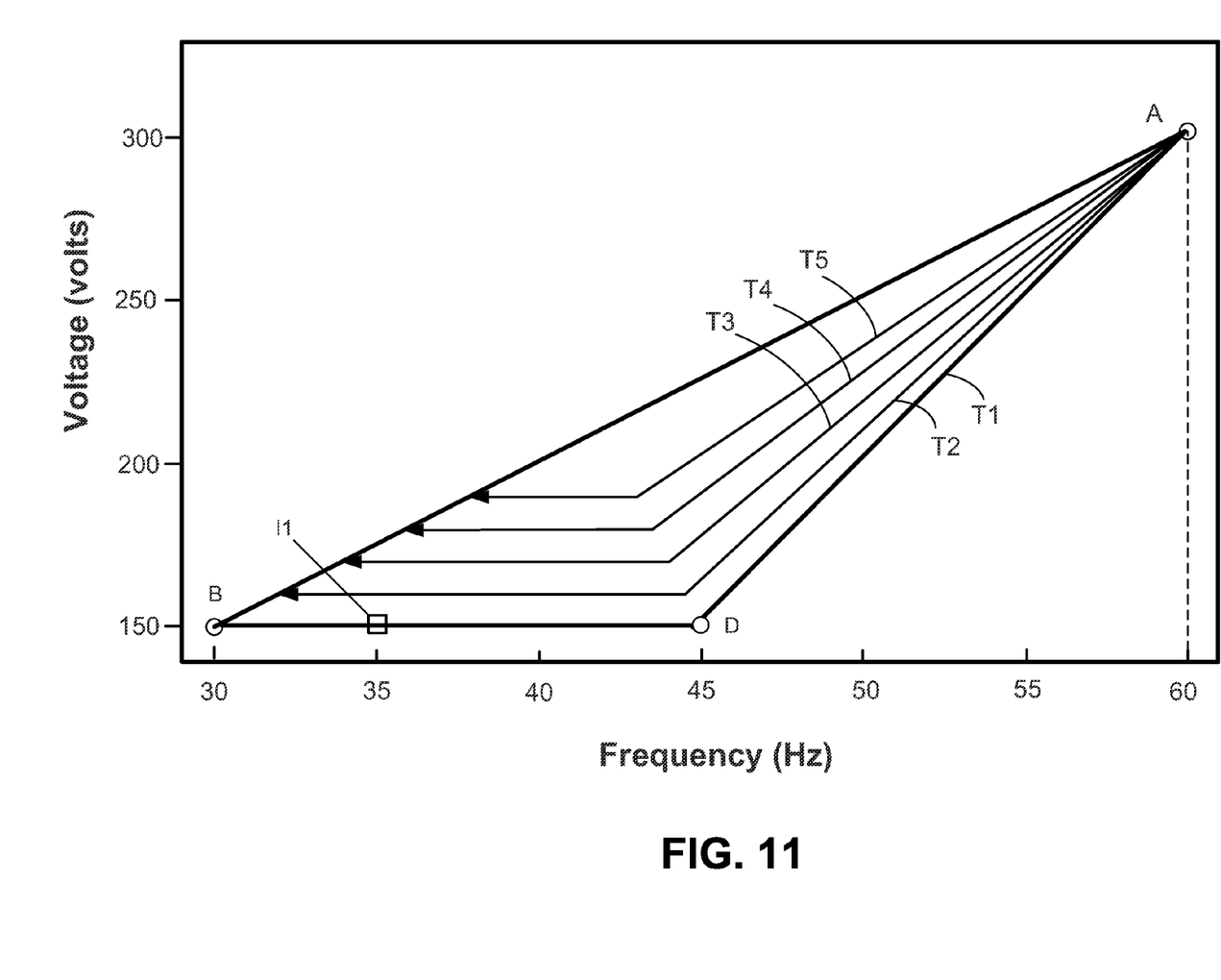

FIGS. 9-11 illustrate further embodiments of a method for adaptively controlling a single phase motor. Referring now to FIG. 9, a volts-hertz graph is provided having flux reduction upper and lower limits AD and AB, respectively, an intrusion point I1, a corner point C, a floor point F1 and a voltage point B1 corresponding to point F1. Corner point C is calculated according to formula (1) to define a floor and a flux reduction level as follows:

$$C=B+D-I1 \qquad (1)$$

Thus, if B=30, D=45 and I1=40, then C=35. In one example, a vertical line is drawn from I1 that defines point F1 where the line intersects segment AC. The operating curve and the variable speed range comprise segment AF1. Line I1F1 represents a voltage offset. In a further example, the operating curve and the variable speed range comprise segments AF1 and B1F1. Referring now to FIG. 10, a volts-hertz graph is provided having intrusion point I1 at 35 hertz. According to formula (1), a corner point C is defined at 40 hertz. The operating curve and the variable speed range comprise segment AC. In a further example, the operating curve and the variable speed range comprise segments AC and I1C. Thus, definition of point C establishes a flux reduction amount and a frequency floor.

As described above, the operating curve defines a volts-hertz relationship so that for a given desired speed, a corresponding voltage value is found from which a motor voltage is generated by the drive unit. An exemplary processing sequence implementing an embodiment of the control method described with reference to FIGS. 9 and 10 is provided below, where a variable "Present_Spd" indicates the speed at which the motor is operating. When an intrusion is detected, Present_Spd indicates the frequency for defining or selecting a new operating curve. The limits of Present_Spd are Floor and Floor_upper_limit. Hz_max and Volts_max are the coordinates of point A. Volt_Hz_Rate is the slope of the operating curve without flux reduction. Max_Flux_Rate is the slope of the operating curve at maximum flux reduction. In the foregoing examples Max_Flux_Rate was defined by segment AD. However, Max_Flux_Rate can be selected to provide more or less flux reduction. Generally, Max_Flux_Rate is selected so that point D approaches but does not cross the fan load curve for the selected motor. Processing sequence "Initialize" sets parameters for the first operating cycle. Processing sequence "Determine Volts" determines the volts for generating the motor volts based on the present speed determined by the speed control loop until an intrusion is detected. After each cycle is done, processing sequence "Update Floor" defines a new floor if necessary. "Intrusion" is a flag indicating whether an intrusion has been detected (Intrusion=1) or not (Intrusion=0).

```
Initialize:
    Floor = Floor_lower_limit
    Volt_Hold = Floor_lower_limit × Volt_Hz_Rate
    Slope = Max_Flux_Rate
    Corner = Volt_Hold × Slope
Determine Volts:
Do
    If Present_Spd < Corner
        Volts = Volt_Hold
    Endif
    If Corner < Present_Spd
        Volts = Present_Spd × Slope
    Endif
    If Intrusion = 1
        Exit
    Endif
Enddo
Update Floor:
If Intrusion = 1
    Error = Present_Spd − Floor
    If Error > 1.0
        Increment Floor by Error (up to Floor_upper_limit)
```

```
        Else
            Increment Floor by 1.0
        Endif
        If Floor > Floor_upper_limit
            Floor = Floor_upper_limit
        Endif
    Else
        Decrement Floor by 0.1
    Endif
    Corner = Floor_upper_limit + Floor_lower_limit − Floor
    Slope = (Volt_Max − Volt_Hold) / (Hz_Max − Corner)
```

In one variation, the processing sequences and variables described above are embedded in the memory of the drive unit described with reference to FIG. 2.

Referring now to FIG. 11, another volts-hertz graph is provided to illustrate a yet further embodiment of a motor control method according to the disclosure. The graph shows five operating curves labeled T1-T5 to illustrate that the curves are defined in five tables stored in a drive unit. Table 1 stores data for generating curve T1, table 2 stores data for generating curve T2, table 3 stores data for generating curve T3, table 4 stores data for generating curve T4 and table 5 stores data for generating curve T5. Initially, table T1 is selected and the motor voltage is generated by looking up a voltage corresponding to the present speed defined by a speed control loop. The present speed according to curve T1 may range between 30 and 60 hertz. Upon detection of an intrusion or completion of a normal cycle, a different curve is selected. In one example, if intrusion I1 is detected while operating in curve T1, curve T2 is selected. Table 2 provides less flux reduction than table 1. The variable speed range of curve T2 is between about 32 hertz and 60 hertz so selection of curve T2 does not provide a floor at or above the frequency of the intrusion. In another example, curve T4 is selected so that the variable speed range will not extend to the frequency of the intrusion. In another example, a floor is imposed as described above in addition to selection of an operating curve. Thus, if intrusion I1 occurs, T2 is selected and a floor is set at 35 hertz. In yet another example, the operating curves extend from point A to segment BD so that the only difference between them is their slope.

In the foregoing embodiments, the operating curve in use before the floor is updated may be referred to as the active or preceding operating curve while the following operating curve, with the updated floor, may be referred to as the succeeding operating curve. Thus, a curve can be a preceding operating curve and also a succeeding operating curve. With reference to FIG. 11, one of the plurality of tables is activated to control the motor and remains active until a new curve must be activated. A processing sequence stores in memory information corresponding to the active operating curve floor and slope, determines whether the active operating curve is at a limit or within limits (e.g. floor or flux reduction limits), determines the occurrence of an intrusion or ending of a normal cycle, and selects a succeeding operating curve in accordance with the embodiments described with reference to FIGS. 4, 7 and 11. The selected curve is activated and the preceding curve is deactivated. Thereafter the motor is controlled according to the activated curve until a further adaptation is needed. After selecting or activating the succeeding operating curve, the drive unit may repeat the process and change to a third, fourth and further operating curves with different shapes.

While straight line relationships have been described to simplify illustration of various embodiments, the invention is not limited to operating curves having only straight lines. In one example, the segment of the operating curve originating at point A is curved in which case the slope of the segment is calculated by an approximation in which a straight line between the beginning and ending points of the curve is drawn, and the slope of the curve is defined by the slope of the straight line. Referring to FIG. 5, in one example segment AB is curved, and the slope of the segment is defined by the slope of a straight line drawn between points A and B. Segment AB and any sloped portion of an operating curve may be referred to as a variable voltage portion of the operating curve. In this manner it is possible to refer to increases or decreases in the slope of a curved line to indicate whether flux is increased or decreased.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating a motor including a starting circuit, the method comprising:
   operating the motor based on a first operating curve to generate a flux in the motor; and
   operating the motor based on a second operating curve to increase the flux relative to the first operating curve to decrease the likelihood of a starting circuit intrusion.

2. A method as in claim 1, further including operating the motor based on a third operating curve after completing a normal start-stop cycle to decrease the flux relative to the second operating curve.

3. A method as in claim 1, further comprising detecting a starting circuit intrusion before operating the motor based on the second operation curve.

4. A method as in claim 3, further comprising waiting a predetermined amount of time after detecting the starting circuit intrusion before operating the motor based on the second operating curve.

5. A method as in claim 3, wherein detecting the starting circuit intrusion includes detecting when a current rises above a current threshold.

6. A method as in claim 3, wherein detecting a starting circuit intrusion includes determining that a current increased without a corresponding speed increase instruction.

7. A method as in claim 1, wherein the first operating curve and the second operating curve are selected from a plurality of operating curves stored in tables in a memory.

8. A method as in claim 1, wherein the first operating curve and the second operating curve are computed according to a computational model stored in a memory.

9. A method of operating a motor including a starting circuit, the method comprising:
   operating the motor within a variable speed range defined by a floor and a maximum speed; and
   raising the floor after detecting a starting circuit intrusion.

10. A method as in claim 9, wherein raising the floor includes setting the floor to a frequency at which the starting circuit intrusion was detected.

11. A method as in claim 9, further comprising lowering the floor after completing a normal start-stop cycle.

12. A method as in claim 11, wherein lowering the speed floor includes lowering the floor by a constant amount.

13. A method as in claim 9, wherein operating the motor within a variable speed range comprises generating a flux in the motor based on a first operating curve, further comprising operating the motor based on a second operating curve to increase the flux relative to the first operating curve to decrease the likelihood of another starting circuit intrusion.

14. A method as in claim 13, further comprising operating the motor based on a third operating curve to decrease the flux relative to the second operating curve after completing a normal start-stop cycle.

15. A system for driving a motor including a starting circuit, the system comprising:
a sensor producing an indication based on a current flowing through the motor; and
a drive unit including a memory, a plurality of processing instructions and a processing device configured to execute the plurality of processing instructions to detect a starting circuit intrusion based on the indication, to generate a flux in the motor based on a first operating curve, and to increase the flux, relative to the first operating curve, according to a second operating curve to decrease the likelihood of another starting circuit intrusion.

16. A system as in claim 15, wherein the indication is the current rising above a current threshold.

17. A system as in claim 15, wherein the indication is the current rising without a corresponding speed increase.

18. A system as in claim 15, wherein the system further comprises a mathematical representation stored in the memory including a slope parameter, and the processing device is configured to compute the first operating curve and the second operating curve based on the mathematical representation, wherein the flux is increased by decreasing the slope.

19. A system as in claim 18, wherein the mathematical representation includes a minimum floor limit ($FL_{min}$), a maximum floor limit ($FL_{max}$), a starting circuit intrusion frequency (I) and a corner frequency (C), the processing device is configured to calculate the slope based on the corner frequency, and the corner frequency defined by the formula $$C=FL_{min}+FL_{max}-I.$$

20. A system as in claim 18, wherein the mathematical representation includes a floor parameter and an intrusion parameter, the floor parameter setting a low end of a variable speed range, the intrusion parameter indicating that a start-stop cycle ended normally if the starting circuit intrusion was not detected and abnormally if the starting circuit intrusion was detected during the start-stop cycle, and the processing device is configured to decrease the floor parameter when the intrusion parameter indicates that the start-stop cycle ended normally.

21. A system as in claim 20, wherein the processing device is configured to increase the floor parameter when the intrusion parameter indicates that the start-stop cycle ended abnormally.

* * * * *